June 8, 1965     H. A. HILTON     3,187,830
MOTORIZED DOLLY

Filed Oct. 11, 1962     2 Sheets-Sheet 1

Henry A. Hilton
INVENTOR.

June 8, 1965  H. A. HILTON  3,187,830
MOTORIZED DOLLY

Filed Oct. 11, 1962  2 Sheets-Sheet 2

Henry A. Hilton
INVENTOR.

United States Patent Office 3,187,830
Patented June 8, 1965

3,187,830
MOTORIZED DOLLY
Henry A. Hilton, 1806 N. 2nd St., St. Joseph, Mo.
Filed Oct. 11, 1962, Ser. No. 229,891
3 Claims. (Cl. 180—20)

The present invention generally relates to load carrying devices, and more specifically to a motorized dolly particularly adapted for use in moving heavy concrete burial vaults, usually from the truck to the grave site.

As will be appreciated, burial valts, because of their great weight, generally from one to two tons, give rise to special handling problems particularly at the cemetery where elaborate equipment cannot of course be assembled or used both because of the condition of the terrain which is generally soft and well kept, and because of the decorum which must be maintained.

Accordingly, a primary object of the present invention is to provide a device for enabling the rapid and efficient moving of a burial vault from the delivery truck to the grave site.

In conjunction with the above object, it is also contemplated that the device of the present invention effect this moving of the burial vault in a manner so as to afford a maximum amount of protection both to the surrounding terrain and to the various low grave markers which might be passed over by the device.

Likewise, it is an object of the present invention to provide a device which is capable of positioning the burial vault directly over the grave so as to greatly facilitate the transfer of the vault from the moving device and down into the grave.

Additionally, it is an intention of the present invention that the transporting device be relatively small in construction with the motor means being easily accessible even when the device is loaded so as to enable the rapid servicing thereof if the need for such servicing should arise.

A further object of the present invention is to provide a motorized dolly which can be remotely controlled with an elongated control cord being provided.

Likewise, an object of the present invention is to use two elongated rollers thus distributing the load over a relatively wide area, both of these rollers being simultaneously driven so as to insure a maximum amount of traction.

Also, it is an object of the present invention to provide a motorized dolly which, while being particularly adapted for the transportation of burial vaults as brought forth supra, is also capable of more general use where the moving of heavy loads is required. For example, the motorized dolly can be used to move various types of large monuments as well as large boilers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged cross-sectional view taken substantially on a plane passing along line 3—3 in FIGURE 1.

Figure 1:
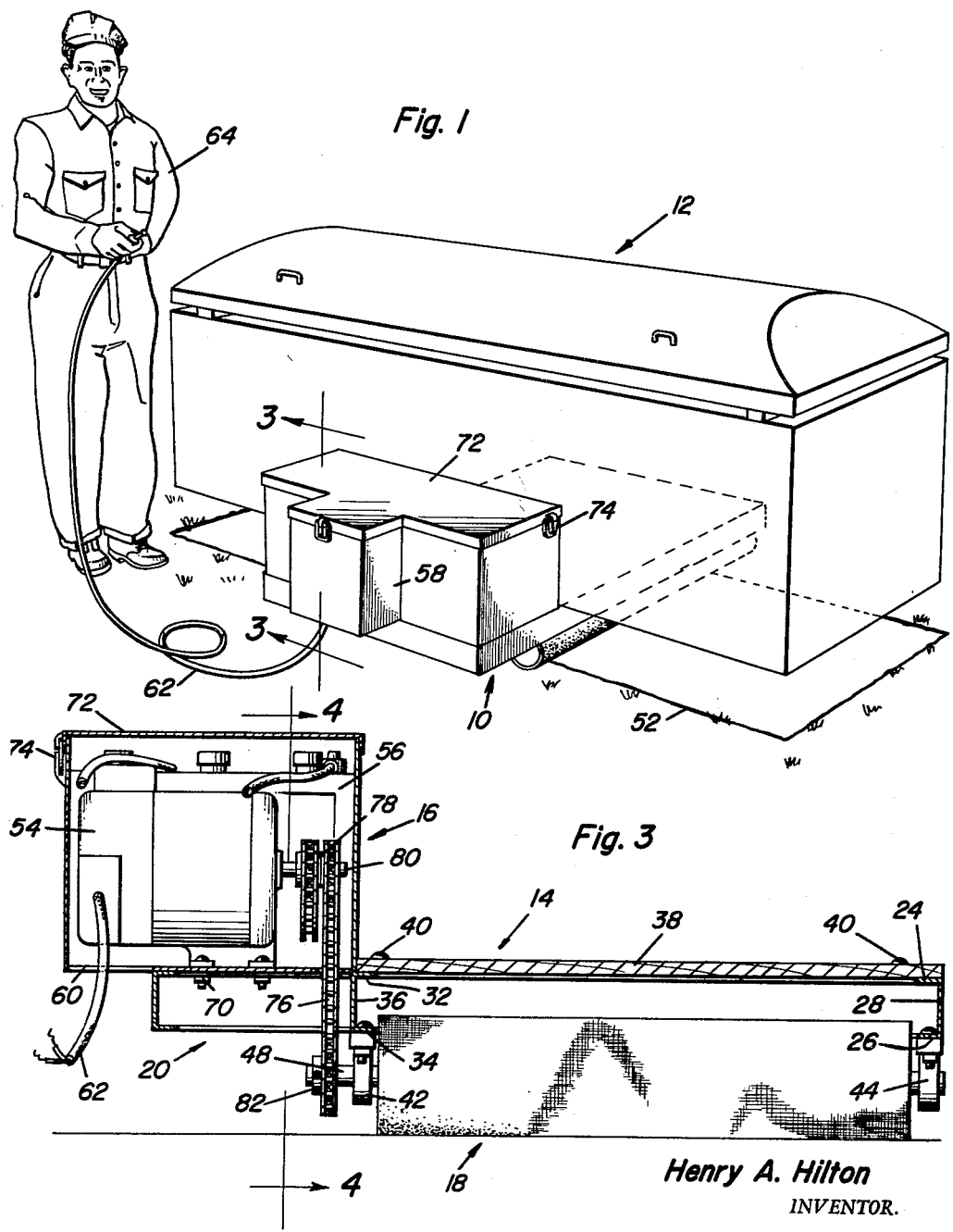
FIGURE 1 is a perspective view illustrating both the manner in which the dolly can be used to position a vault over the grave opening and the manner in which the dolly is to be remotely controlled.

Referring now more particularly to the drawings, reference numeral 10 generally designates the motorized dolly comprising the present invention. This motorized dolly, particularly adaptable for the movement of burial vaults such as the vault 12 illustrated in FIGURE 1, consists essentially of a supporting platform 14, a motor enclosing housing 16 mounted on one end of the supporting platform 14, and two simultaneously driven rollers 18 depending from and supporting the platform.

The supporting platform 14 includes a rectangular frame 20 formed of rigidly interconnected inwardly facing channel shaped members 22 having horizontal upper and lower flanges 24 and 26 and vertical webs 28. Additionally, the frame 20 also includes a transversely extending channel shaped member 30 rigidly secured thereto and similarly including upper and lower horizontal flanges 32 and 34 with a vertical web 36. This cross member 30 is positioned inwardly so as to divide the supporting platform 14 into two sections, the first being the load receiving section and the second having the upright housing 16 mounted thereon.

The load receiving portion of the supporting platform 14, generally substantially larger than the remainder of the platform upon which the housing 16 rests, is provided with a load receiving member 38 preferably consisting of a rectangular relatively thick wooden board of the same size as the load receiving portion and secured to the upper flanges 24 and 32 by suitable bolt means 40. The use of wood as the load receiving member will, because of the inherent resiliency therein, reduce any chance of damage both to the member 38 and to the load to be positioned thereon.

The two rollers 18 which enable the movement of the device 10 are of a length substantially equal to the length of the load receiving portion of the platform 14 and are mounted there beneath by suitable bearings 42 and 44 secured to and depending from the lower flanges 34 and 26 on the frame 20 by bolt means 46, the axial shafts 48 being rotatably received within these bearings 42 and 44. As will be appreciated, the use of such elongated rollers 18 enables the distribution of the load over an extremely wide area so as to make the device 10 particularly adaptable to soften terrain such as is generally encountered in cemeteries. Further, inasmuch as the use of the device 10 in a cemetery frequently requires movement over various ground level grave markers, it is contemplated that the rollers 18 be provided with a resilient protective covering 50 with this covering material 50 preferably having an embossed or raised outer surface so as to increase the traction of the device.

With reference to FIGURE 1, it will be noted that the rollers 18 are of a length so as to span the grave opening 52. This is considered particularly significant in that it enables the positioning of the vault 12 directly over the opening thus greatly facilitating the lowering of the vault 12 into the opening 52 by conventional hoist means which can be attached to the vault 12 while the vault is still loaded on the dolly 10 without any additional transfer of the vault being necessary.

Figure 4:
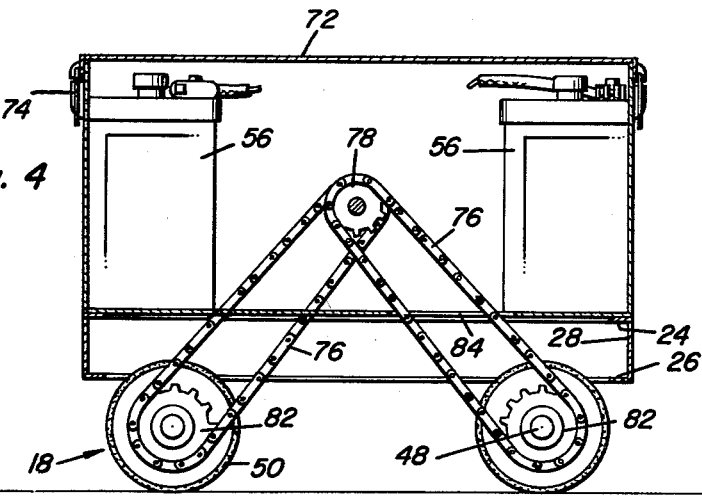
FIGURE 4 is a cross-sectional view taken substantially on a plane passing along line 4—4 in FIGURE 3.

Referring now to the manner of driving the rollers 18, it will be appreciated that the present invention contemplates the simultaneous driving of these rollers thus providing a further means for increasing the traction as might be needed under various conditions such as sloping terrain or wet grass. This simultaneous driving of the rollers 18 is preferably effected by the use of a seven horsepower electric motor 54 and two heavy duty batteries 56. Both the motor 54 and the batteries 56 are provided within the housing 16 which is substantially rectangular in form with a centrally located rearwardly projecting portion 58. The housing 16 is rigidly affixed to the frame 20 with the rearwardly extending portion 58 projecting rearwardly beyond the frame 20 and being provided with an open lower end 60 through which an elongated remote control cord 62 extends with the remote end of the cord 62 having suitable controls thereon for the activation of the electric motor by a user 64 of the device 10. The remainder of the housing 16 is provided with bottom plates 66 and 68 with the central or motor supporting plate 68 being slightly heavier if deemed necessary so as to support the motor 54 which is secured thereto by bolt means 70 in a suitable manner. These plates 66 and 68, as will be appreciated from FIGURES 3 and 4, are secured to the upper flanges 24 of the frame 20. Further, so as to provide ready access to the housing 16 while affording the desired protection from the elements, a removable cover 72 is provided with suitable releasable catches 74 releasably securing the cover 72 to the housing 16.

The power is transferred from the motor 54 to the rollers 18 by two endless drive chains 76 extending about gears 78 mounted on and driven by the motor drive shaft 80 and gears 82 fixedly mounted on the inner ends of the roller shafts 48.

Figure 2:
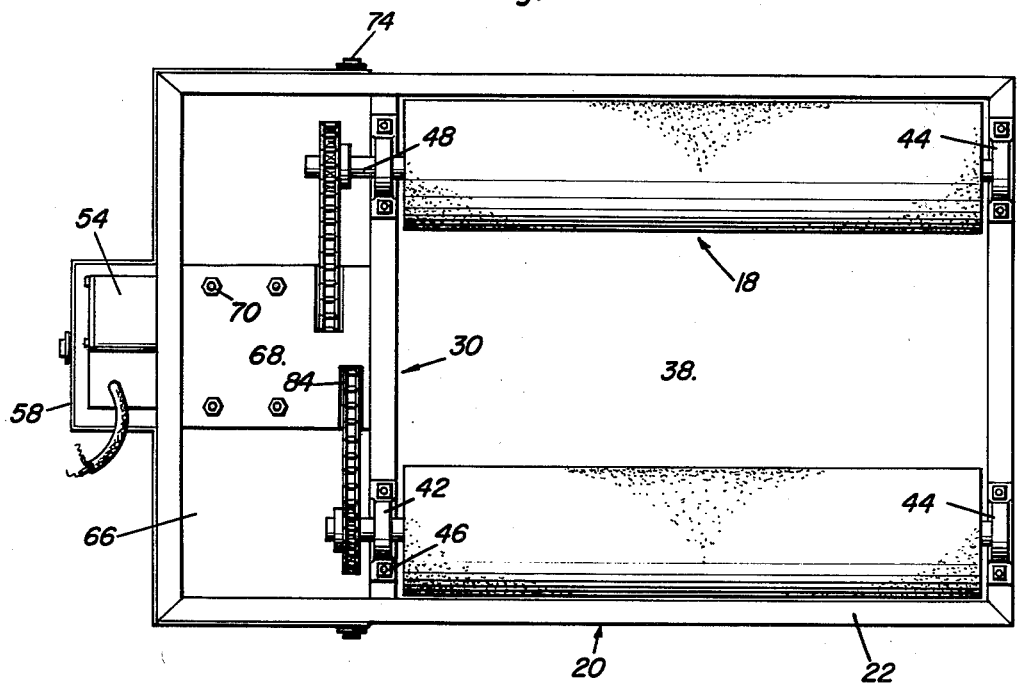
FIGURE 2 is a bottom view of the dolly comprising the present invention.

As will be appreciated from FIGURES 2-4, suitable slots 84 are provided through the bottom plates 66 and 68 so as to allow passage of the chains 76 therethrough.

From the foregoing, it is considered to be readily apparent that a novel motorized dolly has been defined which, while being capable of use as a means for transporting a wide range of loads, is particularly adaptable for use with burial vaults, particularly at the cemetery. When used in this manner, the vault is generally loaded on the dolly on the truck at the plant. After the truck has arrived at the cemetery, skid planks are installed and the dolly having the vault thereon is driven off the truck and directly to the grave site, and in fact directly over the grave opening so as to eliminate a particularly difficult phase of the vault positioning operation. In order that the batteries remain fully charged, it is contemplated that they be provided with suitable wiring for connection to the truck generator while the dolly is on the truck. Also, it will be appreciated that the positioning of the motor housing to one side of the load enables easy access thereto without the necessity of having to move the load.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A burial vault transporting device consisting of a vault supporting platform having a first end and a second end, said platform having a vertically extending housing fixed to the first end thereof, said housing extending along said first end of the platform, a flat load receiving member on that portion of the platform between the housing and the second end of the platform, said housing projecting a substantial distance above the load receiving member, rotatably mounted support means depending from said platform for engagement with the earth, and motor means located within said housing, said motor means being operatively connected to the support means for effecting the rotation thereof, said support means consisting of a pair of spaced parallel elongated rollers extending approximately the full width of the load receiving member from the housing to the second end of the platform so as to position the housing laterally of one end of the rollers and of the path of travel of the rollers.

2. The structure of claim 1 wherein said rollers are simultaneously driven in the same direction.

3. The structure of claim 2 wherein said housing completely encloses the motor means and includes a removable cover along with means for locking the cover in position.

References Cited by the Examiner

UNITED STATES PATENTS

| | | | |
|---|---|---|---|
| 141,653 | 8/73 | Leuhmann | 280—3 X |
| 1,232,414 | 7/17 | Wallis | 180—20 |
| 2,244,528 | 6/41 | Schur | 180—2 X |
| 2,267,509 | 12/41 | Strong | 296—24 |
| 2,528,720 | 11/50 | Kurckenburg | 280—3 |
| 2,539,010 | 1/51 | Cox | 180—6.5 |
| 2,828,826 | 4/58 | Riemenschneider | 180—1 |
| 2,973,048 | 2/61 | Jensen. | |
| 3,054,467 | 9/62 | Seiler | 180—20 |
| 3,059,712 | 10/62 | Hautau | 180—14 X |

A. HARRY LEVY, *Primary Examiner.*

PHILIP ARNOLD, *Examiner.*